(12) United States Patent (10) Patent No.: US 8,110,311 B2
Manabe et al. (45) Date of Patent: Feb. 7, 2012

(54) FUEL CELL SYSTEM

(75) Inventors: Kota Manabe, Toyota (JP); Kimihide Horio, Aichi (JP); Hideaki Mizuno, Owariasahi (JP); Hironori Noto, Tokai (JP); Takashi Yamamoto, Okazaki (JP); Tomoya Ogawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 823 days.

(21) Appl. No.: 12/084,776

(22) PCT Filed: Nov. 20, 2006

(86) PCT No.: PCT/JP2006/323532
§ 371 (c)(1),
(2), (4) Date: May 9, 2008

(87) PCT Pub. No.: WO2007/063785
PCT Pub. Date: Jun. 7, 2007

(65) Prior Publication Data
US 2009/0169935 A1 Jul. 2, 2009

(30) Foreign Application Priority Data
Nov. 30, 2005 (JP) .................................. 2005-344948

(51) Int. Cl.
*H01M 8/04* (2006.01)
(52) U.S. Cl. ........................ 429/429; 429/432; 429/444
(58) Field of Classification Search .................. 429/429, 429/442, 444, 452, 457, 505
See application file for complete search history.

(56) References Cited

U.S. PATENT DOCUMENTS

| | | | |
|---|---|---|---|
| 6,329,089 B1* | 12/2001 | Roberts et al. | 429/429 |
| 2002/0076585 A1* | 6/2002 | Mund | 429/17 |
| 2002/0110717 A1* | 8/2002 | Basel et al. | 429/32 |
| 2002/0182456 A1* | 12/2002 | Condit et al. | 429/13 |
| 2005/0214604 A1* | 9/2005 | Goto et al. | 429/22 |

FOREIGN PATENT DOCUMENTS

| | | |
|---|---|---|
| JP | 1-128362 A | 5/1989 |
| JP | 03-081970 A | 4/1991 |
| JP | 03-219564 A | 9/1991 |
| JP | 11-345624 A | 12/1999 |
| JP | 2003-504807 A | 2/2003 |
| JP | 2003-109636 A | 4/2003 |
| JP | 2004-172106 A | 6/2004 |
| JP | 2005-93143 A | 4/2005 |
| JP | 2005-93282 A | 4/2005 |
| JP | 2005-166547 A | 6/2005 |
| JP | 2006-147550 A | 6/2006 |
| JP | 2006-236739 A | 9/2006 |

* cited by examiner

*Primary Examiner* — Jonathan Crepeau
*Assistant Examiner* — Kenneth Douyette
(74) *Attorney, Agent, or Firm* — Kenyon & Kenyon LLP (57) ABSTRACT

There is provided a fuel cell system capable of warming up a fuel cell while inhibiting generation of a rush current. A control device switches the connection/disconnection between a fuel cell and a short circuit by a shorting relay. The control device spends, before switching the shorting relay from disconnection to connection during starting at a low temperature, an oxidizing gas remaining in the cathode of the fuel cell by driving auxiliary devices to generate an oxidizing gas-deficient state. Then, the control device switches FC relays from ON to OFF and the shorting relay from OFF to ON to thereby complete the preparation for supplying a short-circuit current.

9 Claims, 7 Drawing Sheets

FUEL CELL SYSTEM

This is a 371 national phase application of PCT/JP2006/323532 filed 20 Nov. 2006, which claims priority of Japanese Patent Application No. 2005-344948 filed 30 Nov. 2005, the contents of which are incorporated herein by reference.

TECHNICAL FIELD

The present invention relates to a fuel cell system.

BACKGROUND ART

In general, a fuel cell has a poor starting property at a low temperature as compared with another power source. A power generation efficiency of such a fuel cell decreases with lowering of a temperature. When the temperature is low, a desired voltage/current cannot be supplied, and a device sometimes cannot be started.

In view of such a situation, a technology is disclosed in which a short circuit is constituted between an input terminal and an output terminal (input/output terminals) of the fuel cell connected to a system load, and during starting at a low temperature, the fuel cell is connected to the short circuit by use of a relay or the like, to supply a short-circuit current to a fuel cell main body, whereby heat is generated by the fuel cell itself to warm up the fuel cell (e.g., see Patent Document 1).

[Patent Document 1] Japanese Patent Application Laid-Open No. 2005-93143

DISCLOSURE OF THE INVENTION

However, in a case where a gas (an oxidizing gas and a fuel gas; hereinafter generically referred to as a "reactive gas") which contributes to power generation remains in a fuel cell even during starting at a low temperature, a rush current is generated at a time when the fuel cell is connected to a short circuit, and flows through a fuel cell main body, whereby a problem that the fuel cell breaks and the like occur.

In view of the above-mentioned situation, the present invention has been developed, and an object thereof is to provide a fuel cell system capable of warming up a fuel cell while inhibiting generation of a rush current.

To solve the above-mentioned problem, a fuel cell system according to the present invention is characterized by comprising: a fuel cell; a load connected to the fuel cell; a short circuit provided between an input terminal and an output terminal from the fuel cell to the load; and control means for reducing a reactive gas remaining in the fuel cell, and then connecting the fuel cell to the short circuit.

According to such a constitution, the reactive gas remaining in the fuel cell is reduced, and then the fuel cell is connected to the short circuit, so that it is possible to suppress a problem generated in a case where the fuel cell in which the reactive gas remains is connected, that is, a problem that a rush current is generated to break the fuel cell.

Here, in the above constitution, a configuration is preferable in which the control means allows the fuel cell to generate a power and consume the reactive gas remaining in the fuel cell, thereby reducing the reactive gas. Moreover, a configuration is preferable which further comprises a sensor to detect an output voltage of the fuel cell, wherein the control means stops the power generation of the fuel cell based on a detection result of the sensor, and then connects the fuel cell to the short circuit. Furthermore, a configuration is further preferable in which the reactive gas includes a fuel gas to be supplied to an anode of the fuel cell and an oxidizing gas to be supplied to a cathode, and the control means reduces at least the oxidizing gas.

In addition, in the above constitution, a configuration is preferable which further comprises inactive gas supply means for supplying an inactive gas to the fuel cell, wherein the control means supplies the inactive gas to the fuel cell to reduce the reactive gas remaining in the fuel cell. Moreover, a configuration is preferable which further comprises a sensor to detect an output voltage of the fuel cell, wherein the control means stops the supply of the inactive gas based on a detection result of the sensor, and then connects the fuel cell to the short circuit.

Furthermore, in the above constitution, a configuration is preferable in which the reactive gas cathode, thereby reducing the oxidizing gas. Moreover, a configuration is preferable which further comprises a sensor to detect an output voltage of the fuel cell, wherein the control means stops the supply of the fuel gas based on a detection result of the sensor, and then connects the fuel cell to the short circuit. Furthermore, a configuration is preferable which further comprises adjustment means for connecting the fuel cell to the short circuit, and then adjusting the supply of the oxidizing gas in accordance with a targeted short-circuit current.

As described above, according to the present invention, it is possible to warm up the fuel cell while inhibiting generation of a rush current.

BEST MODE FOR CARRYING OUT THE INVENTION

An embodiment according to the present invention will hereinafter be described with reference to the drawings.

A. First Embodiment

Figure 1:
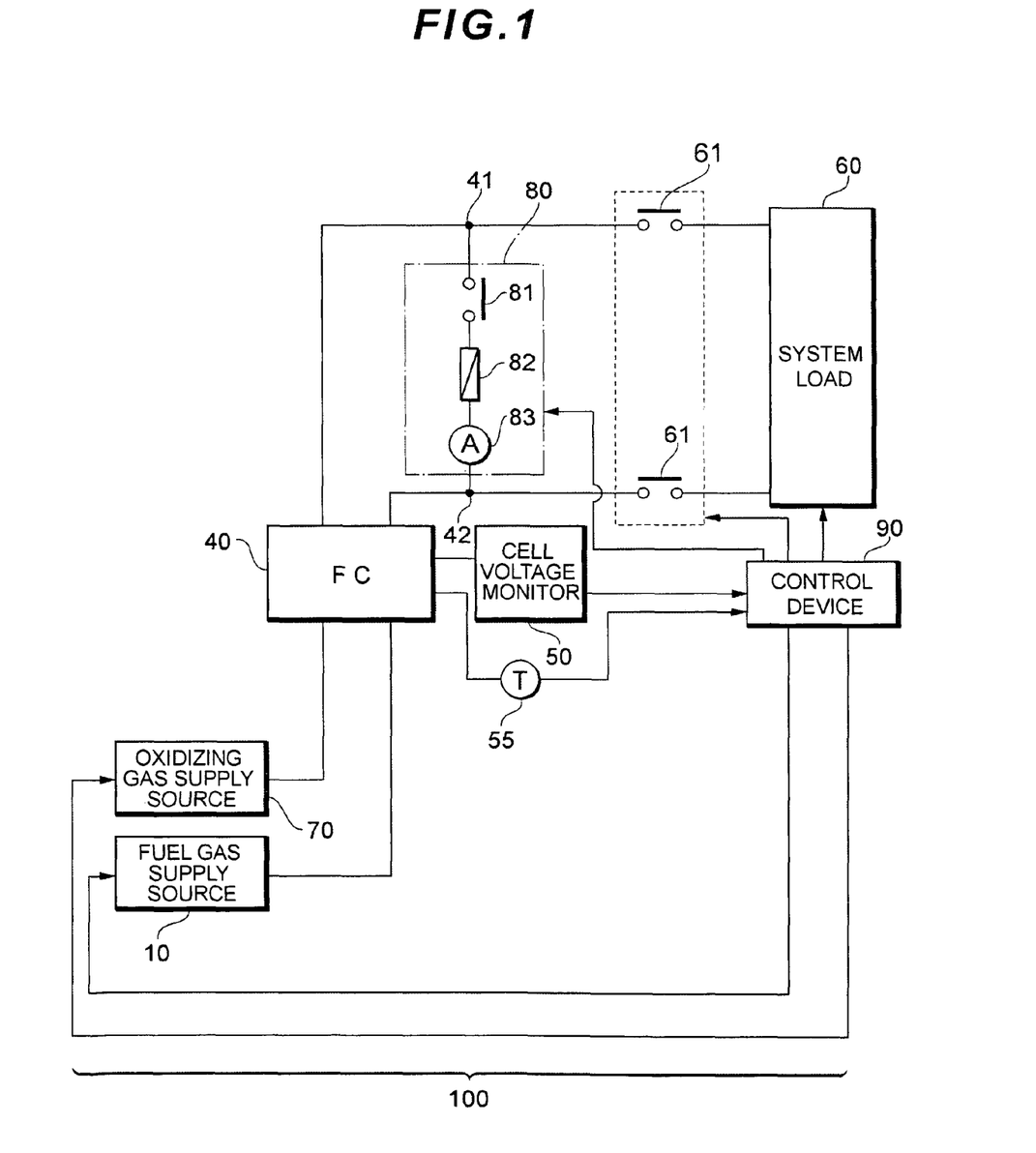
FIG. 1 is a diagram showing a constitution of a main part of a fuel cell system according to a first embodiment.

FIG. 1 is a diagram showing a constitution of a main part of a fuel cell system 100 according to a first embodiment. In the present embodiment, a fuel cell system to be mounted on a vehicle such as a fuel cell hybrid vehicle (FCHV), an electric car or a hybrid car is assumed, but the system may be applied to not only the vehicle but also any type of mobile body (e.g., a ship, an airplane, a robot or the like) or a stationary power source.

A fuel cell 40 is means for generating a power from a supplied reactive gas (a fuel gas and an oxidizing gas), and a fuel cell of any type such as a solid polymer type, a phosphate type or a dissolving carbonate type may be used. The fuel cell 40 has a stack structure in which a plurality of unitary cells including an MEA and the like are laminated in series, and the fuel cell 40 is provided with a cell voltage monitor (a sensor) 50 for detecting each cell voltage.

A fuel gas such as a hydrogen gas is supplied from a fuel gas supply source 10 to a fuel pole (an anode) of the fuel cell 40, whereas an oxidizing gas such as air is supplied from an oxidizing gas supply source 70 to an oxygen pole (a cathode).

The fuel gas supply source 10 is constituted of, for example, a hydrogen tank, various valves and the like, and a valve open degree, an ON/OFF time and the like are adjusted to control an amount of the fuel gas to be supplied to the fuel cell 40.

The oxidizing gas supply source 70 is constituted of, for example, an air compressor, a motor for driving the air compressor, an inverter and the like, and a rotation number of the motor and the like are adjusted to adjust an amount of the oxidizing gas to be supplied to the fuel cell 40.

A system load 60 includes a vehicle auxiliary device and an FC auxiliary device driven with a power supplied from the fuel cell or any type of secondary cell (e.g., a nickel hydrogen battery or the like; not shown). The system load 60 is connected between an input terminal 41 and an output terminal 42 of the fuel cell 40 via FC relays 61. The FC relays 61 are controlled by a control device 90 to switch connection/disconnection between the fuel cell 40 and the system load 60. It is to be noted that the vehicle auxiliary device is any type of power device (an illuminative device, an air conditioning device, a hydraulic pump or the like) for use in running the vehicle or the like, and the FC auxiliary device is any type of power device (a pump for supplying the fuel gas or the oxidizing gas or the like) for use in operating the fuel cell 40.

A short circuit 80 is a circuit for supplying a short-circuit current to the fuel cell 40, and is provided between the input terminal 41 and the output terminal 42 (between the input terminal and the output terminal) of the fuel cell 40. The short circuit 80 is constituted by connecting a shorting relay 81, a fuse 82 and a current sensor 83 in series. The shorting relay 81 is controlled by the control device 90 to switch the connection/disconnection between the fuel cell 40 and the short circuit 80. The fuse 82 realizes fail safe during failure of the shorting relay 81. When the current (the short-circuit current) excessively flows through the short circuit 80 owing to generation of the rush current or the like, the fuse itself fuses to block the current, thereby protecting the fuel cell 40. The current sensor 83 detects a current flowing through the short circuit 80, and outputs a detection result to the control device 90.

The control device (control means) 90 is constituted of a CPU, an ROM, an RAM and the like, and centrally controls units of the system based on each input sensor signal. Moreover, for example, in a case where a starting instruction of the system is input and a temperature measured with a temperature sensor 555 is lower than a reference temperature, the control device 90 performs preprocessing as described later, and then connects the shorting relay 81 to supply the short-circuit current to the fuel cell 40, whereby control is performed so as to raise the temperature in the fuel cell 40.

Figure 2A:
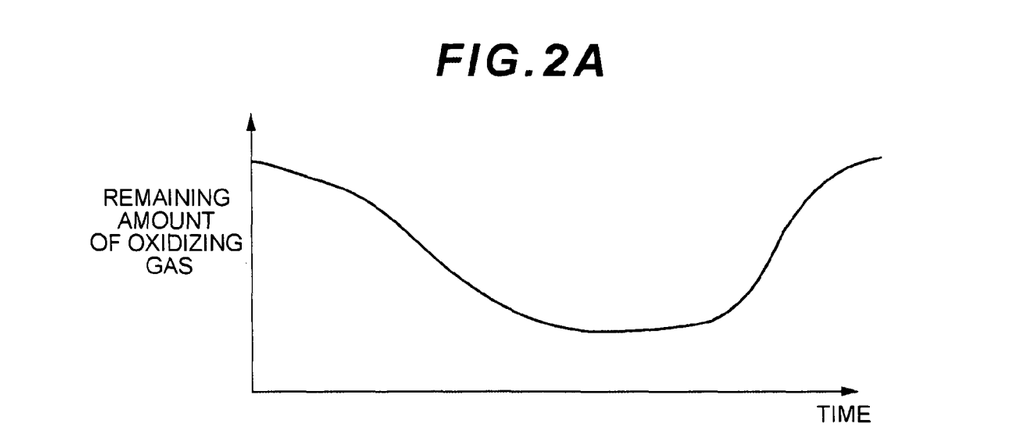
FIG. 2A is a diagram showing a method for connecting a conventional shorting relay.
Figure 2B:
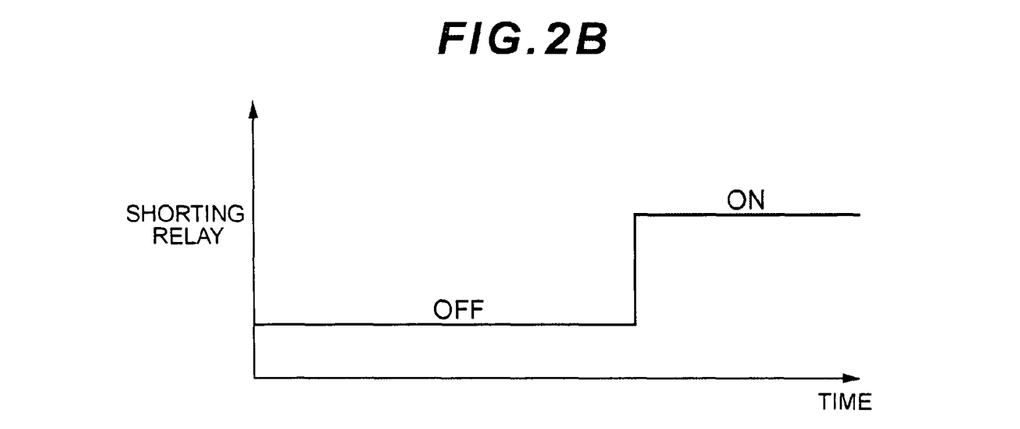
FIG. 2B is a diagram showing a method for connecting the conventional shorting relay.
Figure 2C:
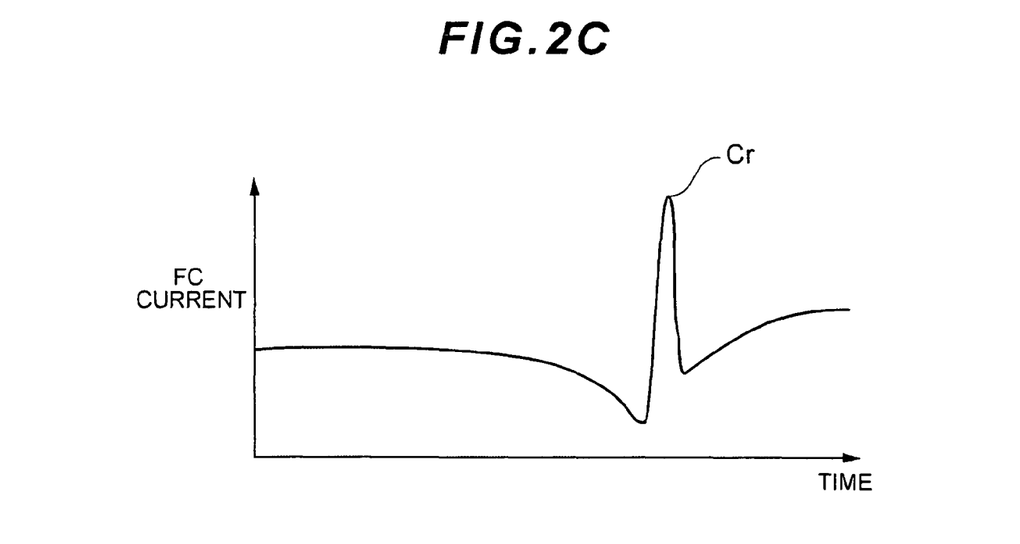
FIG. 2C is a diagram showing a method for connecting the conventional shorting relay.
Figure 3A:
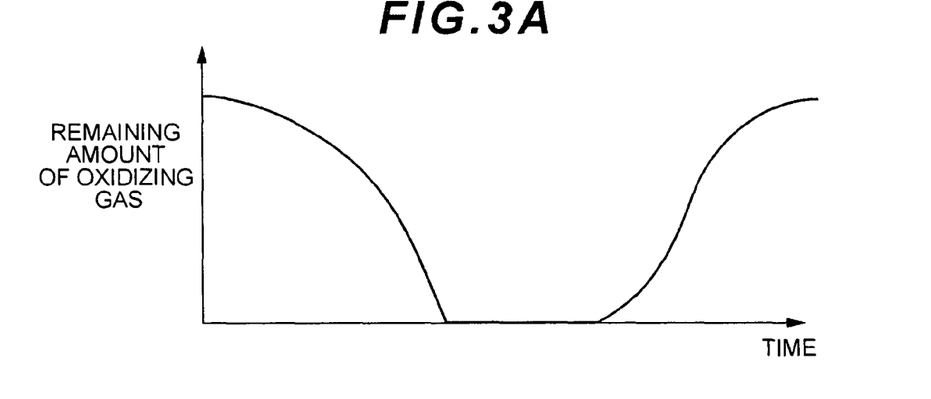
FIG. 3A is a diagram showing a method for connecting a shorting relay according to the present invention.
Figure 3B:
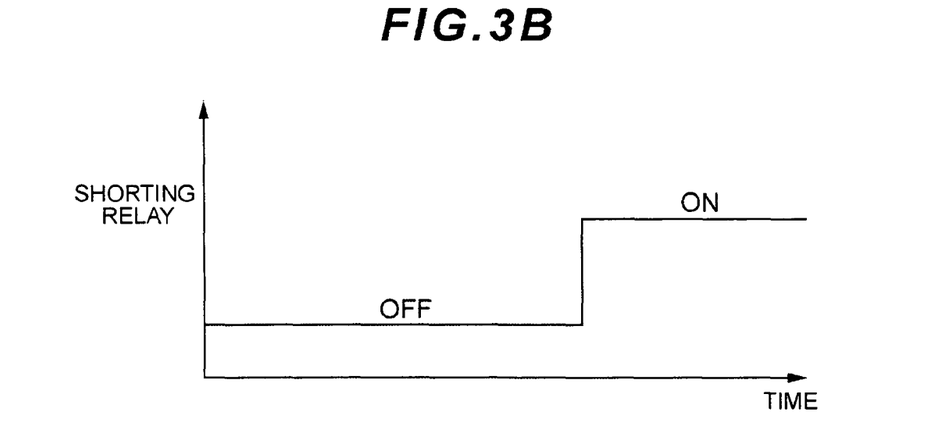
FIG. 3B is a diagram showing a method for connecting the shorting relay according to the present invention.
Figure 3C:
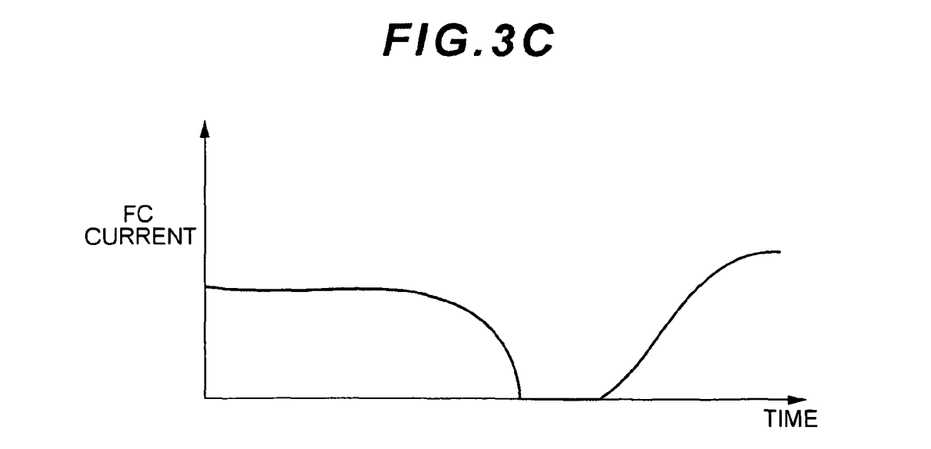
FIG. 3C is a diagram showing a method for connecting the shorting relay according to the present invention.

FIGS. 2A to 2C are diagrams showing a method for connecting a conventional shorting relay, and FIGS. 3A to 3C are diagrams showing a method for connecting a shorting relay according to the present invention. FIGS. 2A and 3A show an amount of a remaining oxidizing gas, FIGS. 2B and 3B show a switch timing of the connection/disconnection of the shorting relay, and FIGS. 2C and 3C are diagrams showing a current (an FC current) flowing through the fuel cell 40.

As shown in FIGS. 2A to 2C, in a case where the shorting relay is switched from disconnection to connection (from OFF to ON) in a state in which the oxidizing gas remains in the cathode of the fuel cell 40, a rush current Cr is generated during relay connection, and the current flows through the fuel cell 40 to cause breakage or the like.

To solve the problem, in the present invention, as shown in FIGS. 3A to 3C, auxiliary devices are driven before switching the shorting relay from the disconnection to the connection, whereby the oxidizing gas remaining in the cathode of the fuel cell 40 is consumed to form an oxidizing gas deficient state (hereinafter referred to as the preprocessing). Thus, the oxidizing gas deficient state is formed, and then the shorting relay is connected to supply the short-circuit current through the fuel cell 40, whereby the fuel cell can be warmed up while inhibiting the generation of the rush current.

The preprocessing according to the present invention will hereinafter be described in detail with reference to the drawings.

Figure 4:
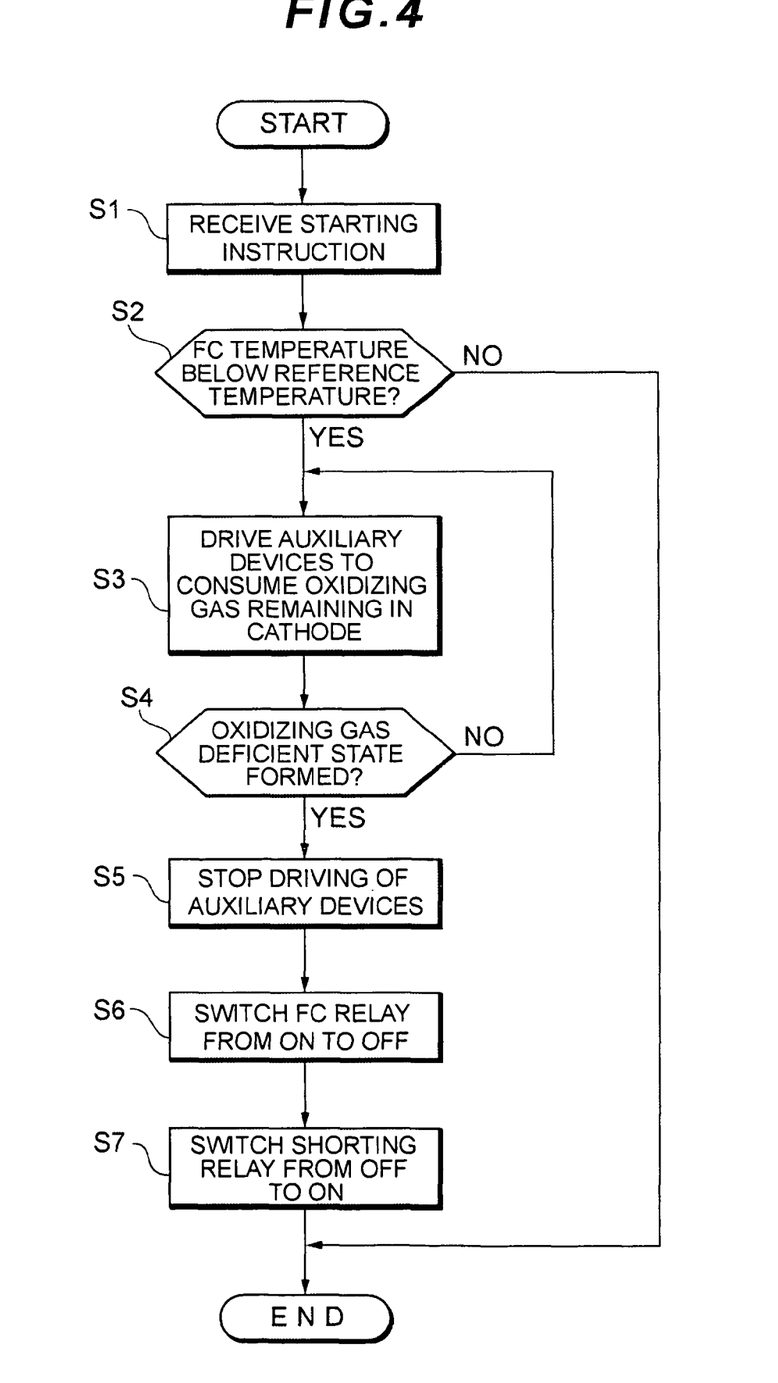
FIG. 4 is a flow chart showing preprocessing according to a first embodiment.

FIG. 4 is a flow chart showing the preprocessing.

On receiving a starting instruction of the system from an operation switch (not shown), the control device 90 judges whether or not a temperature (hereinafter referred to as an FC temperature) of the fuel cell 40 measured with the temperature sensor 55 is below a set reference temperature (step S1→step S2). When the FC temperature exceeds the reference temperature (step S2; NO), the control device 90 ends processing without executing steps. On the other hand, when the FC temperature is below the reference temperature (step S2; YES), the control device 90 allows the fuel cell 40 to generate the power, and starts driving the auxiliary devices so as to consume (reduce) the oxidizing gas remaining in the cathode of the fuel cell 40. Specifically, the supply of the oxidizing gas to the cathode of the fuel cell 40 is stopped, whereas a sufficient amount of the fuel gas is supplied to the anode of the fuel cell 40, whereby the fuel cell 40 generates the power, and the driving of the auxiliary devices is started. Needless to say, instead of driving the auxiliary devices, the generated power may be accumulated in a secondary cell such as a battery or a capacitor (either is not shown).

The control device 90 advances to step S4 to judge whether or not the oxidizing gas deficient state has been formed. Specifically, it is detected whether or not each cell voltage detected by the cell voltage monitor (the sensor) 50 lowers to a predetermined value (e.g., around 0 V). In a case where each cell voltage lowers to the predetermined value, it is judged that the oxidizing gas deficient state has been formed. On the other hand, when each cell voltage does not lower to the predetermined value, it is judged that the oxidizing gas deficient state is not formed.

In a case where it is judged that the oxidizing gas deficient state is not formed (step S4; NO), the control device 90 returns to the step S3 to continue driving the auxiliary devices. On the other hand, in a case where it is judged that the oxidizing gas deficient state has been formed (step S4; YES), the control device 90 stops the driving of the auxiliary devices, and switches the FC relays 61 from ON to OFF, whereby the fuel cell 40 is electrically disconnected from the system load 60 (step S5→step S6). Furthermore, the control device 90 switches the shorting relay 81 from OFF to ON to electrically connect the fuel cell 40 to the short circuit 80 (step S7), and prepares for the supply of the short-circuit current, thereby ending the processing.

When such preprocessing is performed, the control device 90 supplies the fuel gas and the oxidizing gas, and allows the fuel cell 40 to start the power generation. As a result, the short-circuit current flows through the fuel cell 40 which generates heat from itself, and the fuel cell 40 is warmed up. It is to be noted that a current value of the short-circuit current, a time to supply the short-circuit current and the like may appropriately be set in accordance with a warm-up temperature of the fuel cell 40. Moreover, the current value of the short-circuit current may be controlled so that the current value detected by the current sensor 83 is a predetermined value (α targeted current value or the like; hereinafter referred to as a target short-circuit current value). Specifically, the control device (adjustment means) 90 obtains a required amount of the oxidizing gas from the current value detected by the current sensor 83 and the target short-circuit current value, and may control driving of an air compressor or the like so that the obtained amount of the oxidizing gas is supplied to the fuel cell 40.

Furthermore, the short circuit 80 is provided with the fuse 82, so that even when abnormality occurs in the current sensor 83 or the like and an excessively large current flows through the short circuit 80, it can be prevented that the current flows through the fuel cell 40.

As described above, according to the present embodiment, the oxidizing gas remaining in the cathode of the fuel cell is consumed to form the oxidizing gas deficient state, and then the shorting relay is connected to supply the short-circuit current to the fuel cell, whereby the fuel cell can be warmed up while inhibiting the generation of the rush current.

In the above example, a case where the oxidizing gas deficient state is formed and then the short-circuit current is supplied to the fuel cell has been described, but instead (or in addition), the oxidizing gas deficient state is formed, and then the short-circuit current may be supplied to the fuel cell. However, when the fuel cell 40 generates the power in a fuel gas deficient state, the MEA and the like of the fuel cell 40 are damaged. On the other hand, it is experimentally confirmed that when the fuel cell 40 generates the power in the oxidizing gas deficient state, the MEA and the like are not damaged. Therefore, it is preferable that the oxidizing gas deficient state is formed and then the short-circuit current is supplied to the fuel cell.

B. Second Embodiment

In the above first embodiment, a case where the oxidizing gas remaining in the cathode is consumed to form the oxidizing gas deficient state has been described. In a second embodiment, a case where an inactive gas is supplied and an oxidizing gas remaining in a cathode is pushed out to form an oxidizing gas deficient state will be described.

Figure 5:
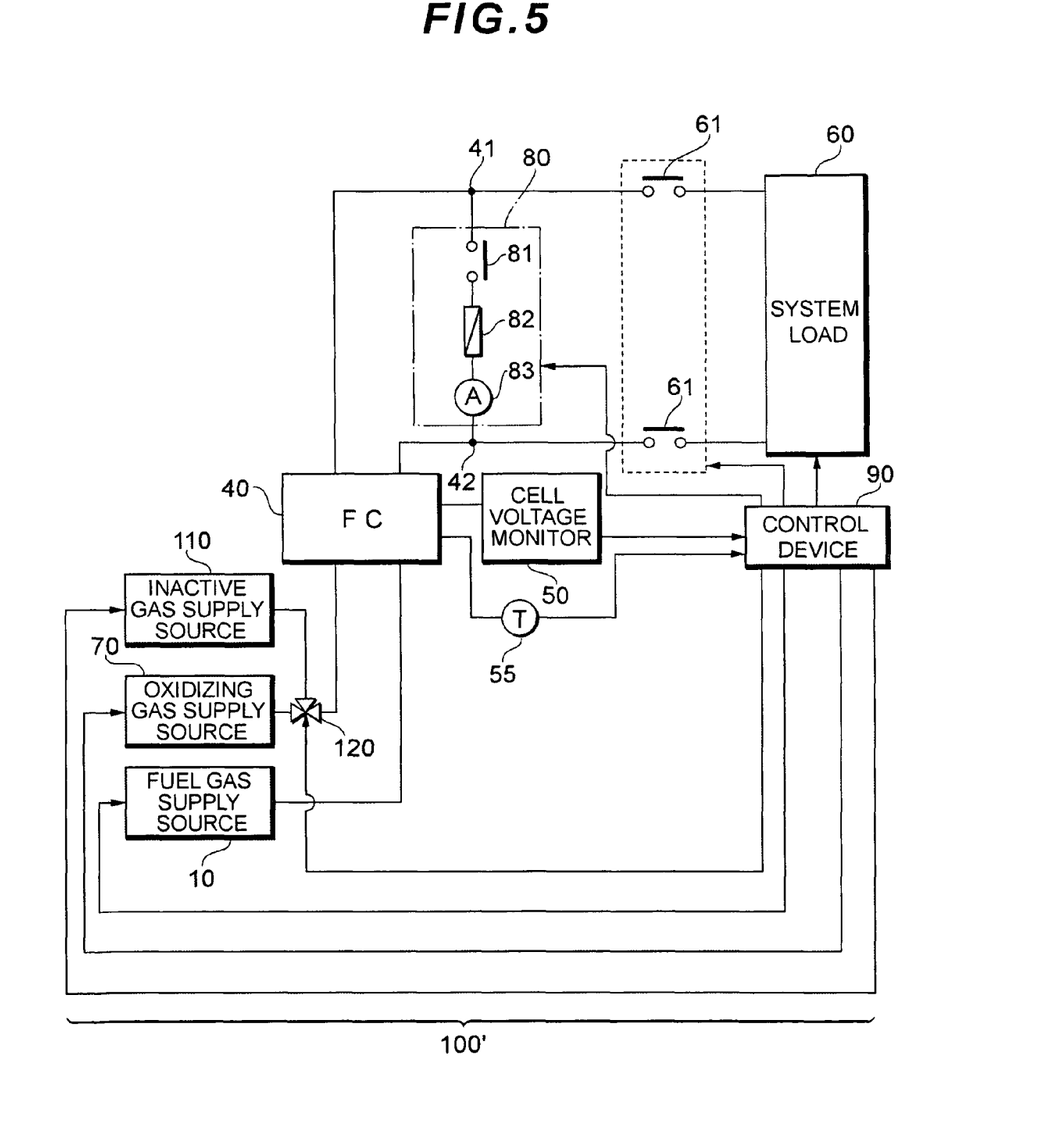
FIG. 5 is a diagram showing a constitution of a main part of the fuel cell system according to a second embodiment.

FIG. 5 is a diagram showing a constitution of a fuel cell system 100' according to the second embodiment.

In the fuel cell system 100', the fuel cell system 100 shown in FIG. 1 is provided with an inactive gas supply source 110 and a three-way valve 120. Therefore, a part corresponding to FIG. 1 is denoted with the same reference numerals, and detailed description thereof is omitted.

The inactive gas supply source (inactive gas supply means) 110 is means for supplying an inactive gas such as an $N_2$ gas, and is constituted of a high-pressure tank filled with the inactive gas, a pump and the like.

The three-way valve 120 is provided in an oxidizing gas supply path, and is controlled by a control device 90 to switch a gas to be supplied to a fuel cell 40. Specifically, the three-way valve 120 is controlled to switch supply of the oxidizing gas or the inactive gas to the anode of the fuel cell 40.

Figure 6:
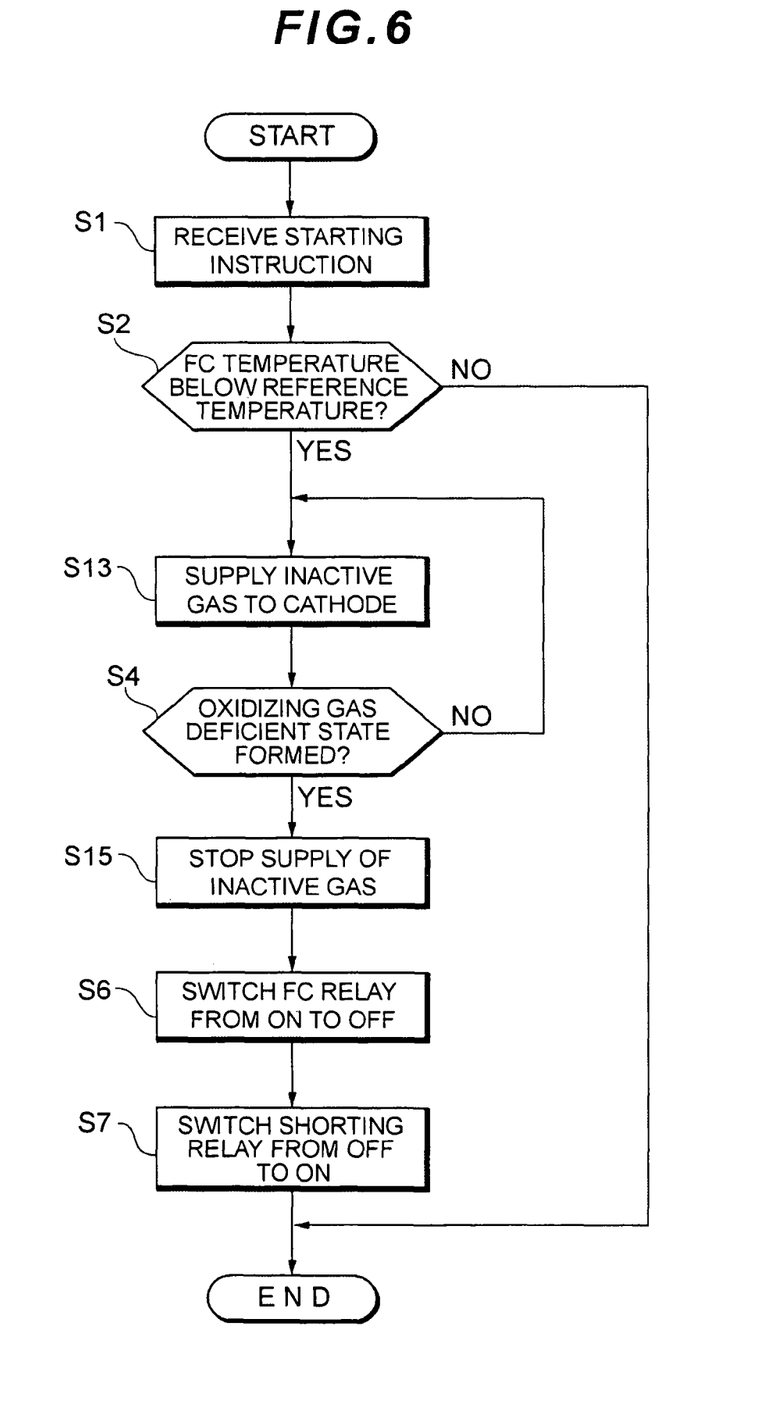
FIG. 6 is a flow chart showing preprocessing according to a second embodiment.

FIG. 6 is a flow chart showing preprocessing according to the second embodiment. It is to be noted that in a flow shown in FIG. 6, instead of the steps S3, S5 shown in FIG. 4, steps S13, S15 are provided. Therefore, the other steps are denoted with the same reference numerals, and detailed description thereof is omitted.

In a case where the control device 90 judges that an FC temperature is below a reference temperature (step S2; YES), the three-way valve 120 is switched to start supply of the inactive gas to the cathode of the fuel cell 40 so as to push out (reduce) the oxidizing gas remaining in the cathode of the fuel cell 40 (step S13).

When the control device 90 advances to step S4, it is judged whether or not an oxidizing gas deficient state has been formed by pushing out the oxidizing gas remaining in the cathode of the fuel cell 40 with the supplied inactive gas. Specifically, it is judged whether or not each cell voltage detected by a cell voltage monitor 50 lowers to a predetermined value (e.g., around 0 V). When each cell voltage lowers to the predetermined value, it is judged that the oxidizing gas deficient state has been formed. On the other hand, when each cell voltage does not appropriately lower, it is judged that the oxidizing gas deficient state is not formed.

In a case where the control device 90 judges that the oxidizing gas deficient state is not formed (step S4; NO), the device returns to the step S13 to continue the supply of the inactive gas. On the other hand, in a case where it is judged that the oxidizing gas deficient state has been formed (step S4; YES), the control device 90 stops the supply of the inactive gas, and switches FC relays 61 from ON to OFF to electrically disconnect the fuel cell 40 from a system load 60 (step S15→step S6). It is to be noted that the subsequent operation is similar to that of the first embodiment, and hence further description is omitted.

Thus, the inactive gas may be supplied to the cathode of the fuel cell to reduce the oxidizing gas and form the oxidizing gas deficient state.

It is to be noted that in the above example, the inactive gas is supplied to the cathode of the fuel cell to form the oxidizing gas deficient state, but instead (or in addition), the inactive gas may be supplied to the anode of the fuel cell to form a fuel gas deficient state.

Thus, in a case where the fuel gas remaining in the anode is reduced without generating any power from the fuel cell, a problem that an MEA and the like of the fuel cell are damaged does not occur (see the first embodiment), and hence the inactive gas may be supplied to either the anode or the cathode.

C. Third Embodiment

In the above first embodiment, the oxidizing gas remaining in the cathode is consumed to form the oxidizing gas deficient state, but in a third embodiment, the oxidizing gas deficient state is formed by cross leak of a fuel gas from an anode to the cathode.

Figure 7:
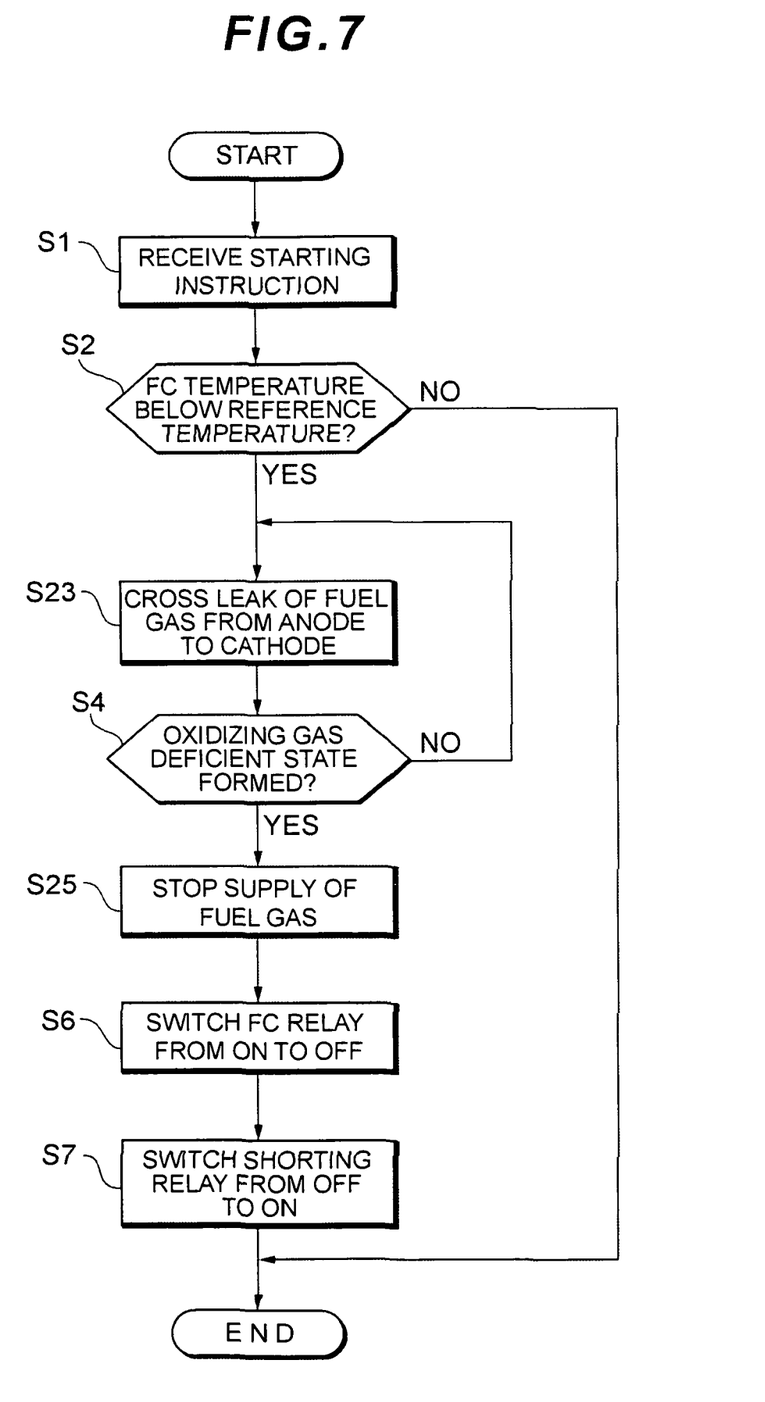
FIG. 7 is a flow chart showing preprocessing according to a third embodiment.

FIG. 7 is a flow chart showing preprocessing according to the third embodiment. It is to be noted that in a flow shown in FIG. 7, instead of the steps S3, S5 shown in FIG. 4, steps S23, S25 are provided. Therefore, the other steps are denoted with the same reference numerals, and detailed description thereof is omitted.

In a case where a control device 90 judges that an FC temperature is below a reference temperature (step S2; YES), supply of the oxidizing gas to the cathode is stopped, whereas a sufficient amount of the fuel gas is supplied to the anode of a fuel cell 40. As well known, a molecular diameter of the fuel gas (e.g., a hydrogen gas) to be supplied to the anode is smaller than that of the oxidizing gas to be supplied to the cathode, so that the cross leak of the fuel gas from the anode to the cathode is started (step S23).

When the control device 90 advances to step S4, it is judged whether or not an oxidizing gas deficient state has been formed by pushing out the oxidizing gas remaining in the cathode of the fuel cell 40 with the fuel gas generated by the cross leak. Specifically, it is judged whether or not each cell voltage detected by a cell voltage monitor 50 lowers to a predetermined value (e.g., around 0 V). When each cell voltage lowers to the predetermined value, it is judged that the oxidizing gas deficient state has been formed. On the other hand, when each cell voltage does not appropriately lower, it is judged that the oxidizing gas deficient state is not formed.

In a case where the control device 90 judges that the oxidizing gas deficient state is not formed (step S4; NO), the device returns to the step S23 to continue the cross leak of the fuel gas (e.g., for 30 seconds). On the other hand, in a case where it is judged that the oxidizing gas deficient state has been formed (step S4; YES), the control device 90 stops the supply of the fuel gas to the anode, and switches FC relays 61 from ON to OFF to electrically disconnect the fuel cell 40 from a system load 60 (step S25→step S6). It is to be noted that the subsequent operation is similar to that of the first embodiment, and hence further description is omitted.

Thus, the cross leak of the fuel gas from the anode to the cathode may be generated to push out the oxidizing gas remaining in the cathode with the fuel gas generated by the cross leak, whereby the oxidizing gas is reduced to form the oxidizing gas deficient state.

D. Modification

In the above embodiments, warm-up during starting at a low temperature has been assumed, but the present invention is applicable in any case where the warm-up is required, for example, a case where rapid warm-up is performed before stopping a system operation.

Moreover, in the above embodiments, as means for switching connection/disconnection between a fuel cell 40 and a short circuit 80, a shorting relay 81 has been illustrated, but a semiconductor switch constituted of IGBT, FET and the like may be used. It is to be noted that the short circuit 80 may be provided with an LCR load for limiting a current during short-circuit. The short circuit 80 may not be provided with a fuse 82 or a current sensor 83.

The invention claimed is:

1. A fuel cell system comprising:
   a fuel cell;
   a load;
   a pair of relays connecting an input terminal and an output terminal of the fuel cell to the load respectively;
   a short circuit provided between the input terminal and output terminal of the fuel cell; and
   a control device programmed to reduce a reactive gas remaining in the fuel cell so as to inhibit generation of a rush current when the fuel cell and the short circuit are connected, and then disconnecting the load from the fuel cell by shutting off the pair of relays and connecting the fuel cell to the short circuit and then supplying a short-circuit current to the fuel cell during starting at a low temperature.

2. The fuel cell system according to claim 1, wherein the control device allows the fuel cell to generate a power and consume the reactive gas remaining in the fuel cell, thereby reducing the reactive gas.

3. The fuel cell system according to claim 2, which further comprises a sensor to detect an output voltage of the fuel cell, wherein the control device stops the power generation of the fuel cell based on a detection result of the sensor, and then connects the fuel cell to the short circuit.

4. The fuel cell system according to claim 1, wherein the reactive gas includes a fuel gas to be supplied to an anode of the fuel cell and an oxidizing gas to be supplied to a cathode, and
   the control device reduces at least the oxidizing gas of the reactive gases remaining in the fuel cell.

5. The fuel cell system according to claim 1, which further comprises inactive gas supply means for supplying an inactive gas to the fuel cell,
   wherein the control device supplies the inactive gas to the fuel cell to reduce the reactive gas remaining in the fuel cell.

6. The fuel cell system according to claim 5, which further comprises a sensor to detect an output voltage of the fuel cell,
   wherein the control device stops the supply of the inactive gas based on a detection result of the sensor, and then connects the fuel cell to the short circuit.

7. The fuel cell system according to claim 1, wherein the reactive gas includes a fuel gas to be supplied to an anode of the fuel cell and an oxidizing gas to be supplied to a cathode, and
   the control device supplies the fuel gas to the anode to cause cross leak of the fuel gas from the anode to the cathode, thereby reducing the oxidizing gas of the reactive gases remaining in the fuel cell.

8. The fuel cell system according to claim 7, which further comprises a sensor to detect an output voltage of the fuel cell,
   wherein the control device stops the supply of the fuel gas based on a detection result of the sensor, and then connects the fuel cell to the short circuit.

9. The fuel cell system according to claim 4, which further comprises an adjustment device for connecting the fuel cell to the short circuit, and then adjusting the amount of supply of the oxidizing gas to be supplied to the fuel cell in accordance with a targeted short-circuit current value so that a current value of a short-circuit current flowing in the fuel cell to be the targeted short-circuit current value.

* * * * *

UNITED STATES PATENT AND TRADEMARK OFFICE
CERTIFICATE OF CORRECTION

PATENT NO. : 8,110,311 B2  
APPLICATION NO. : 12/084776  
DATED : February 7, 2012  
INVENTOR(S) : Kota Manabe et al.

Page 1 of 1

It is certified that error appears in the above-identified patent and that said Letters Patent is hereby corrected as shown below:

| Column | Line | |
|---|---|---|
| 2 | 16 | After "reactive gas" insert --includes a fuel gas to be supplied to an anode of the fuel cell and an oxidizing gas to be supplied to a cathode, and the control means supplies the fuel gas to the anode to cause cross leak of the fuel gas from the anode to the--. |
| 5 | 14 | After "value" change "(α targeted..." to --(a targeted...--. |

Signed and Sealed this  
First Day of May, 2012

David J. Kappos  
*Director of the United States Patent and Trademark Office*